US007498277B2

(12) United States Patent
Pace et al.

(10) Patent No.: US 7,498,277 B2
(45) Date of Patent: Mar. 3, 2009

(54) PAD PRINTING ON TEXTILE SUBSTRATES

(75) Inventors: Edmund L. Pace, Pfafftown, NC (US); Gregory S. Braxton, Pfafftown, NC (US)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 52 days.

(21) Appl. No.: 10/352,536

(22) Filed: Jan. 28, 2003

(65) Prior Publication Data

US 2004/0146698 A1 Jul. 29, 2004

(51) Int. Cl.
*B32B 5/16* (2006.01)
*B32B 27/14* (2006.01)
*B32B 9/00* (2006.01)

(52) U.S. Cl. .......................... 442/69; 442/75; 442/304; 428/40.8; 428/41.2; 428/41.6

(58) Field of Classification Search ............... 428/40.8, 428/41.2, 41.6; 101/171, 35, 163; 442/304, 442/69, 75
See application file for complete search history.

(56) References Cited

U.S. PATENT DOCUMENTS 1,993,524 A * 3/1935 Poschel ........................ 8/470
2,340,979 A * 2/1944 Ostolaza et al. ............ 101/175
3,669,818 A * 6/1972 Stark .......................... 428/88
4,060,031 A 11/1977 Philipp ....................... 101/163
4,161,563 A 7/1979 Metzger ..................... 428/233
4,745,863 A 5/1988 Takezaki .................... 101/426
4,982,659 A 1/1991 Cohen ........................ 101/287
5,014,614 A 5/1991 Thieme ....................... 101/35
5,537,921 A 7/1996 Adner et al. .................. 101/35
5,542,351 A * 8/1996 Roth .......................... 101/483
5,806,419 A 9/1998 Adner et al. .................. 101/35
5,921,177 A 7/1999 Shin ........................... 101/163
5,922,625 A 7/1999 Haruta et al. ................. 442/75
6,012,403 A 1/2000 Codos et al. ................ 112/117
6,106,022 A 8/2000 Badash et al. ................ 283/81
6,263,816 B1 7/2001 Codos et al. ........... 112/475.08
6,276,266 B1 8/2001 Dietz et al. .................... 101/41
6,322,866 B1 11/2001 Sloot ......................... 428/40.1

FOREIGN PATENT DOCUMENTS

BE 836933 A * 1/1975
DE 195 43 333 5/1997
EP 552771 A * 1/1992
EP 0645489 9/1994
JP 62138282 A * 12/1985
WO WO 02/08512 1/2002

OTHER PUBLICATIONS

Pad Printing Machinery of Vermont, Supply Catalog, Jun. 2000.

* cited by examiner

*Primary Examiner*—Lynda Salvatore
(74) *Attorney, Agent, or Firm*—Womble Carlyle Sandridge & Rice, PLLC

(57) ABSTRACT

A method for pad printing a pattern on a textile substrate with a pad printing machine, and fabric and apparel so formed from the textile substrate. The method includes the steps of positioning the textile substrate on the printing area of the pad printing machine, transferring a pattern having at least one color from the cliche of the pad printing machine to a printing pad, and transferring the pattern from the printing pad to the textile substrate.

29 Claims, 4 Drawing Sheets

FIG. 2
PRIOR ART
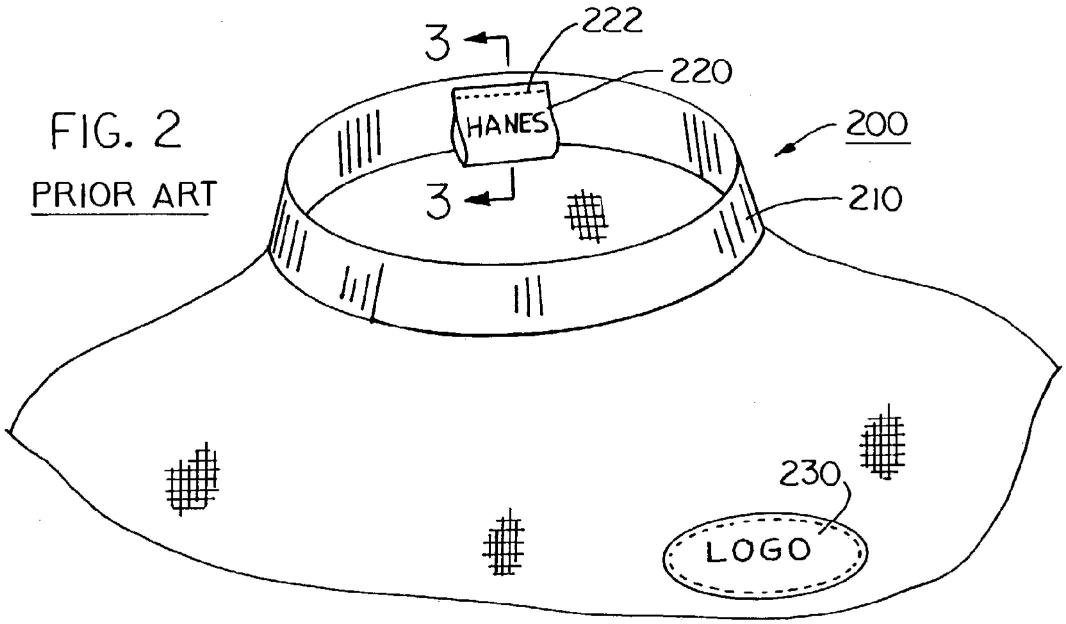
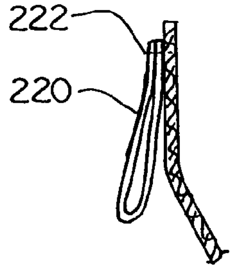
FIG. 3
FIG. 5
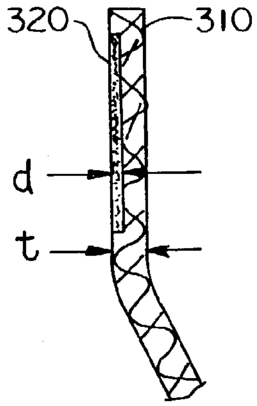
FIG. 4
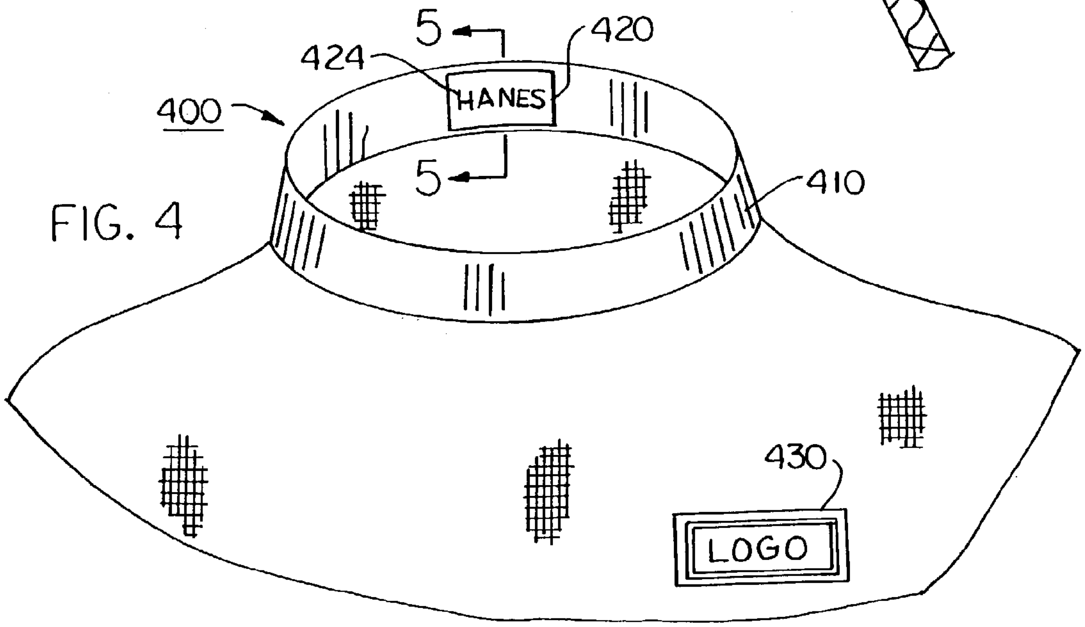

PAD PRINTING ON TEXTILE SUBSTRATES

FIELD OF THE INVENTION

The present invention relates to the field of printing, and, more particularly to a method for printing labels or other patterns on textile substrates, such as fabrics and apparel.

BACKGROUND OF THE INVENTION

Depending upon the type and style of apparel, the manufacture of apparel involves numerous steps, including forming a fabric, dyeing and finishing the fabric, cutting the fabric, and sewing the cut fabric into individual items of apparel. Typically, one of the last steps in the manufacturing process is the application of one or more labels. These labels are intended to be source identifiers, to provide size or garment care information, or provide warnings or legal disclaimers.

Labels are sometimes adhesively affixed to the garment, but are more conventionally sewn into the garment, either on an open surface or along a hem or seam. Labels that are adhesively affixed, however, cannot normally be affixed to items of apparel that must be drycleaned or laundered. Labels that must be sewn into garments require an additional step of affixing the label to the garment and the additional embroidered or printed label stock, all of which amounts to additional costs for the finished garment. Additionally, the labels typically must be sewn in a different area of the sewing facility or at an entirely different facility.

Another problem with labels or tags that are sewn into the apparel is that they must sometimes be located where they are visible, but are nevertheless uncomfortable to the wearer. For example, product tags in T-shirts are sewn inside the neck area of the shirt. Depending upon how the tag is sewn, it may be also be uncomfortable for the wearer. In such cases, wearers often remove these tags. As a result, product identification and care information is lost, and the garment is frequently damaged during the process of removing the tag.

One method that has been attempted has been to transfer print a product label within a garment. The results, however, have not been satisfactory. First, transfer printing leaves a raised pattern on the surface of the garment. Inherently, the raised pattern of dried ink does not have a good hand, and is thus uncomfortable to the wearer. Also, transfer printing cannot withstand repeated laundering and wears off after only a few home washings. The costs associated with transfer printing labels onto garments, including label stock and labor costs, are also relatively high.

SUMMARY OF THE INVENTION

One aspect of the present invention is directed to a method for printing a pattern on a textile substrate with a pad printing machine. Pad printing was developed for printing on irregular shaped solid objects such as golf balls, coffee mugs, and the like. Thus, pad printing has not heretofore been known for printing patterns on permeable textile substrates.

The method of the present invention includes the steps of positioning a textile substrate on the printing bed, or printing area, of a pad printing machine, transferring a pattern comprising at least one color from the cliche to the printing pad, and transferring the pattern from the printing pad to the textile substrate. The textile substrate may be knitted, woven, or non-woven fabric. The fabric may be formed from, but is not limited to, yarns of cotton, polyester, nylon, lycra, spandex, or combinations and intimate blends thereof.

As is known in the art, the pattern to be transferred is etched in a cliche and may comprise multiple colors. It has been found that a cliché pattern that has a depth less than the thickness of the textile substrate will transfer a clear pattern to the textile substrate, without penetrating the thickness of the substrate. This permits patterns such as labels or printed indicia to be printed on one side, without being substantially visible on the opposite side of the textile substrate. Because the inks used in pad printing dry rapidly, it has been found that the transferred ink pattern will not "bleed".

A further aspect of the present invention is directed to fabric that is pad printed and apparel formed therefrom. Desirably, the fabric has a thickness of at least about 40 microns. In one preferred embodiment, the article of apparel is formed from knitted fabric. More specifically, the apparel may comprise underwear, outerwear, activewear, and intimate apparel. For pad printing patterns such as product labels on articles of apparel, the depth of the cliche is between about 40 microns and 100 microns.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

BRIEF DESCRIPTION OF THE DRAWINGS

FIG. 2 illustrates the prior art process of attaching labels or patterns to articles of apparel;

FIG. 3 is a sectional view taken along Line 3-3 of FIG. 2;

FIG. 4 illustrates the process of pad printing patterns according to the present invention;

FIG. 5 is a sectional view taken along Line 5-5 of FIG. 4; and

DETAILED DESCRIPTION OF THE PREFERRED EMBODIMENTS

The present invention is directed to a method of pad printing a pattern on a textile substrate, a fabric that is pad printed with a pattern thereon, and a tagless article of apparel formed from the fabric. As it is conventionally defined in the art, "pad printing" refers to the transfer of an image from an etched plate, or cliche, onto an object to the printed via a printing pad.

Figure 1:
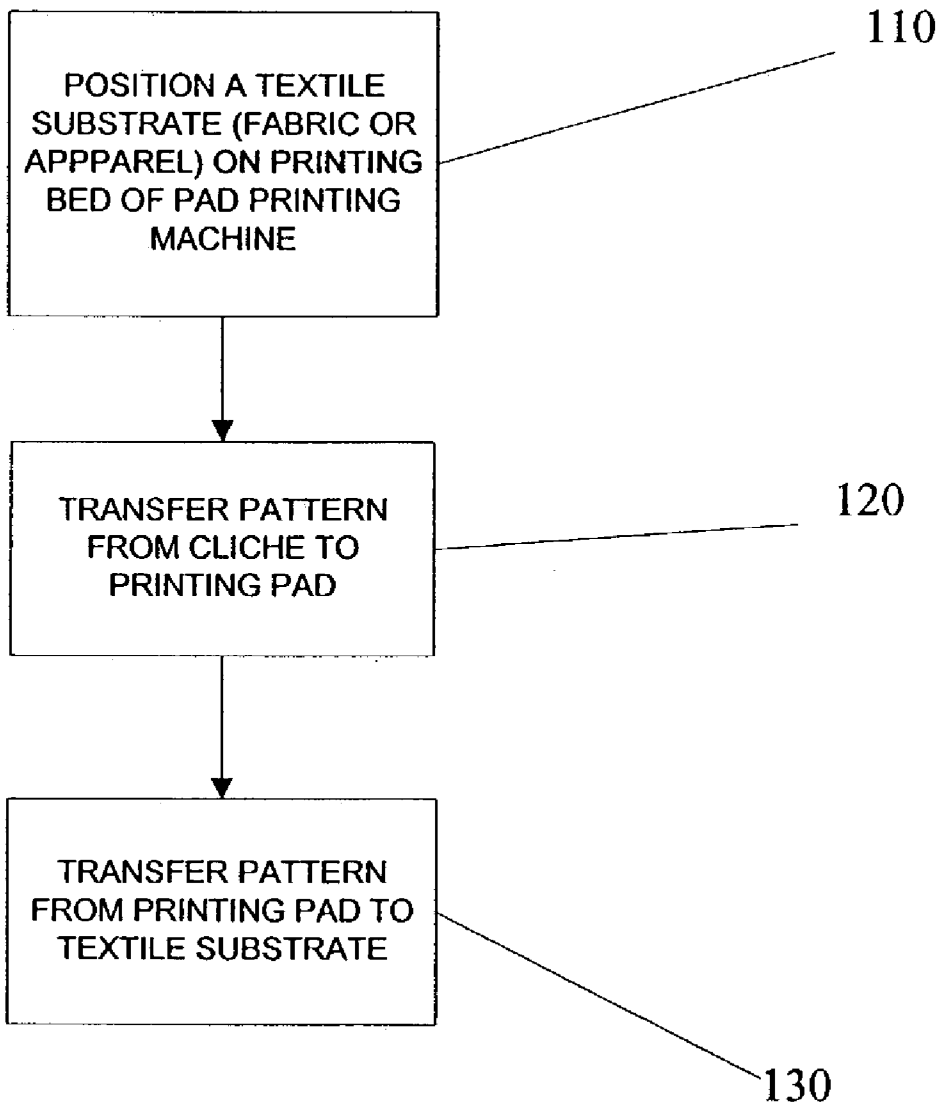
FIG. 1 is a flow diagram of the pad printing process of the present invention

As shown in FIG. 1, one aspect of the present invention is directed to the method for pad printing a pattern on a textile substrate with a pad printing machine. Pad printing machines are well known in the art and the types and features of such machines and their operational parameters are well known. Typically, however, a pad printing machine comprising a printing bed, or printing area, at least one cliche, and at least one printing pad. Since such machines are known to those skilled in the art, a description of pad printing equipment is not necessary herein, except where specific features are needed to practice the present invention. One suitable pad printing machine, however, is the Inkprint 60LPE2C, available from Comec of Milan, Italy. This pad printing machine is electro-pneumatically operated and controlled by a microprocessor. The machine can print in two colors, and can print two objects simultaneously. While this particular machine has been found quite suitable, the invention is not limited to this machine or to two color printing.

Unlike conventional pad printed "objects," the material to be pad printed in the present invention is a substantially flat textile substrate, i.e., fabric. It has been found that the printing pads conventionally used to print indicia on solid shaped objects, such as golf balls and coffee mugs, may also be used to print patterns on substantially flat textile substrates. By the phrase "substantially flat", we mean that the substrate may be pad printed while positioned in a relatively flat, or planar position (Step 110). As those skilled in the art will appreciate, textile substrates, fabrics, and apparel formed therefrom, are pliable and may be easily manipulated into numerous orientations for printing. Thus, the invention is not limited to printing on textile substrates in a particular orientation.

As used herein, the "textile substrate" may be a knitted, woven, or non-woven fabric. The fabric may be formed from any of the conventionally known materials such as cotton, polyester, nylon, lycra, and spandex, or combinations and intimate blends thereof; however, the fabric is not limited to those materials. For example, while not an exhaustive list, the fabric may be formed from 100 percent cotton, 100 percent nylon, cotton/polyester, cotton/spandex, nylon/spandex, and polyester/cotton/spandex. As those skilled in the art will also appreciate, a wide range of fabric constructions are possible and may be pad printed according to the present invention.

It has also been found that the fabric forming the textile substrate is desirably at least about 40 microns in thickness, as will be explained in greater detail below. For example, pantyhose may have a thickness of about 50 microns (0.002 inches). Other fabric constructions, such as a knitted fleece, may be over 3,000 microns (0.13 inches) in thickness.

Once the textile substrate has been positioned on the printing area or bed of the pad printing machine, the pattern is transferred from the etched cliche to the printing pad (Step 120). Conventionally, the patterns to be pad printed on non-textile, solid objects, are etched in the cliche to a depth of between about 20 microns and 40 microns. It has been found, however, that the etched pattern of the present invention should have a depth of between about 40 microns and 100 microns. It has been found that a deeper pattern is needed to achieve the depth and penetration needed for a clear, dense printed pattern. As will be understood, however, the depth of the pattern will depend on the thickness of the textile substrate. Specifically, the depth of the etched pattern is less than the thickness of the fabric so that the printed pattern has sufficient penetration, without completely penetrating the textile substrate.

While there are numerous inks that are used in pad printing applications, it has been found that an acrylic-based ink provides the most suitable image. One such ink, available from Comec, is Ink No. PLT6. As with other pad print inks, the PLT6 ink uses a quick drying solvent and will dry at room temperature in approximately 2-3 minutes. It will completely harden after about 24 hours. A hardener is also mixed with the PLT6 ink in a ratio of between about ½ to 1 part hardener to 10 parts ink. As will be further described below, it has also been found that the hardener enhances the durability of the ink on the printed textile substrate.

One pad selected for the present invention is a rectangular, silicone rubber pad. As those skilled in the art know, the choice of pads depends on a number of factors, including the dimensions of the print area, the shape of the surface to be printed, and the texture of the surface to the printed. One particular pad selected for printing rectangular patterns, such as product labels, is Model No. 267 BJB, available from Comec.

After the pattern has been transferred from the cliche to the pad, the pad is manipulated into position to transfer the inked image to the textile substrate (Step 130).

Another aspect of the present invention is a pad printed fabric, and tagless apparel formed therefrom. By "tagless" apparel, it is meant apparel having product labels or other embellishments that are not comprised of traditional sewn-in product tags or embroidered patterns. By "embellishment", we mean decorative or fanciful images or patterns, ornamentation, etc. Referring now to FIG. 2, an exemplary article of prior art apparel is illustrated. Specifically shown is the manner in which product labels, such as label 220, have been conventionally attached to the apparel. Label 220 is shown here sewn into the neck 210 of a shirt 200. As better seen in FIG. 3, the product label or tag 220 is shown in a sectional view as sewn to the shirt 200 along at least one stitch line 222. Further, other patterns or indicia 230, such as corporate names and logos, for example, are either sewn or embroidered to the garment 200. As described hereinabove, the steps of attaching separate labels involve additional manufacturing costs, including additional material and labor costs.

Turning now to FIG. 4, the fabric and apparel 400 formed therefrom are shown with patterns 420 and 430 pad printed thereon in accordance with the present invention. Pattern 420 is exemplary of a product label, having at least one form of indicia 424 printed inside the neck band of shirt 400. Similarly, pattern 430 is shown pad printed on shirt 400 in accordance with the present invention.

FIG. 5 better illustrates how a pattern, such as a product label, is formed according to the pad printing process of the present invention. As shown in FIG. 5, and as described hereinabove, the pattern transferred from the cliche and printed on the article of apparel has a depth, d, that is less than the thickness, t, of the fabric to be printed. This permits the pattern to penetrate the fabric substrate, forming a deep, clear image, without completely penetrating or "bleeding" through the fabric. As those in the textile and apparel arts will appreciate, this results in a printed product label or other embellishment that appears substantially identical to the sewn tag 222 of the prior art garment 200. The printed image, however, is not substantially visible from the outside (back) of the garment.

Figure 7:
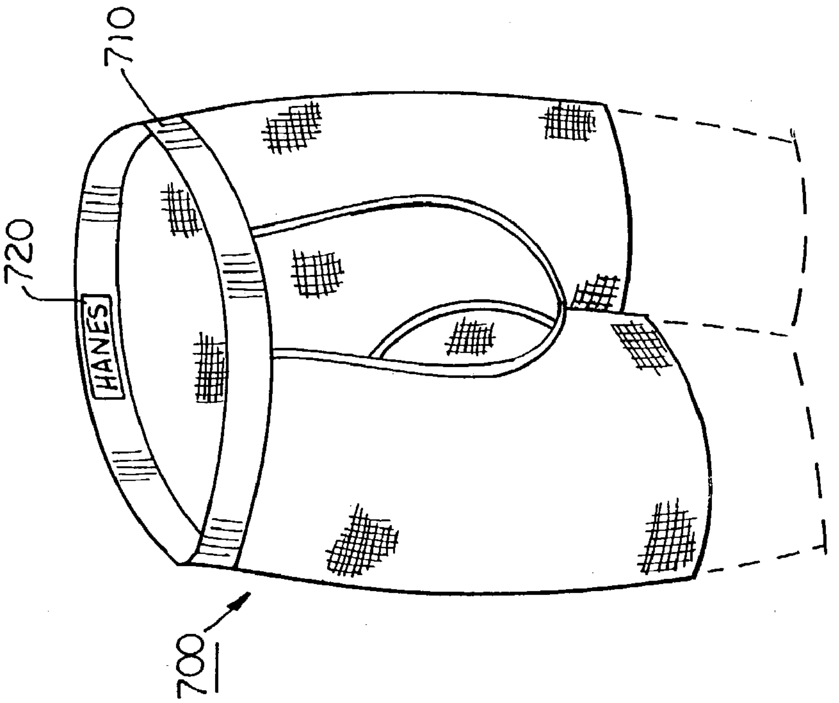
FIGS. 6 through 8 are exemplary embodiments of apparel having patterns pad printed thereon.
Figure 6:
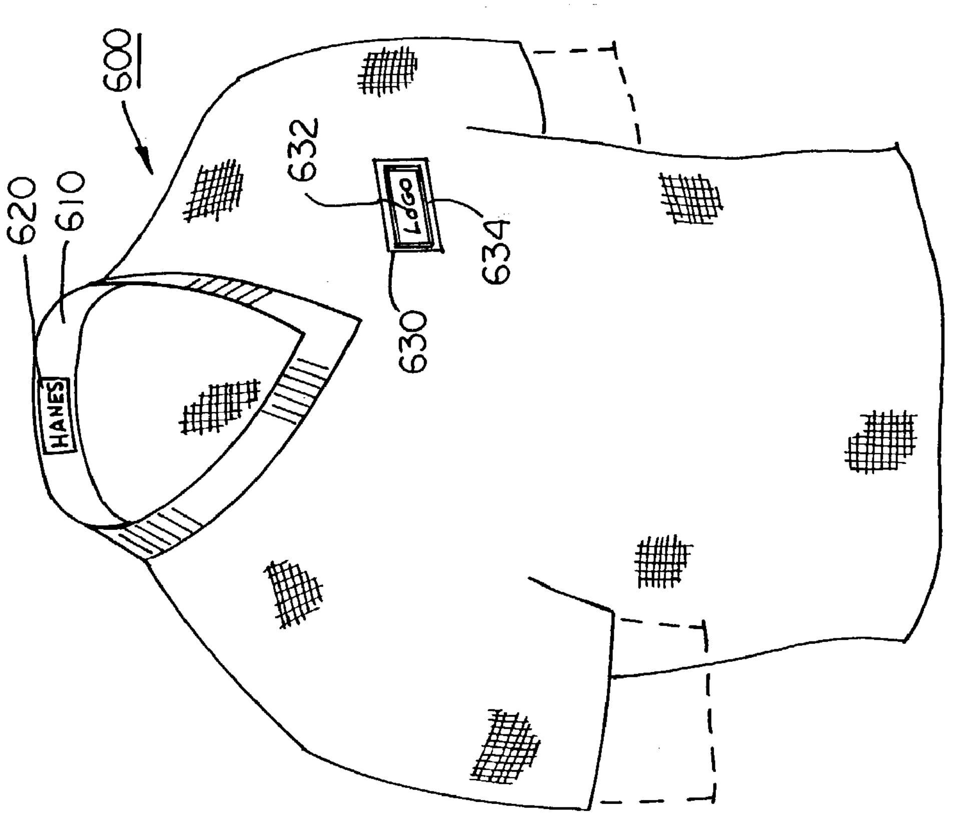
Figure 8:
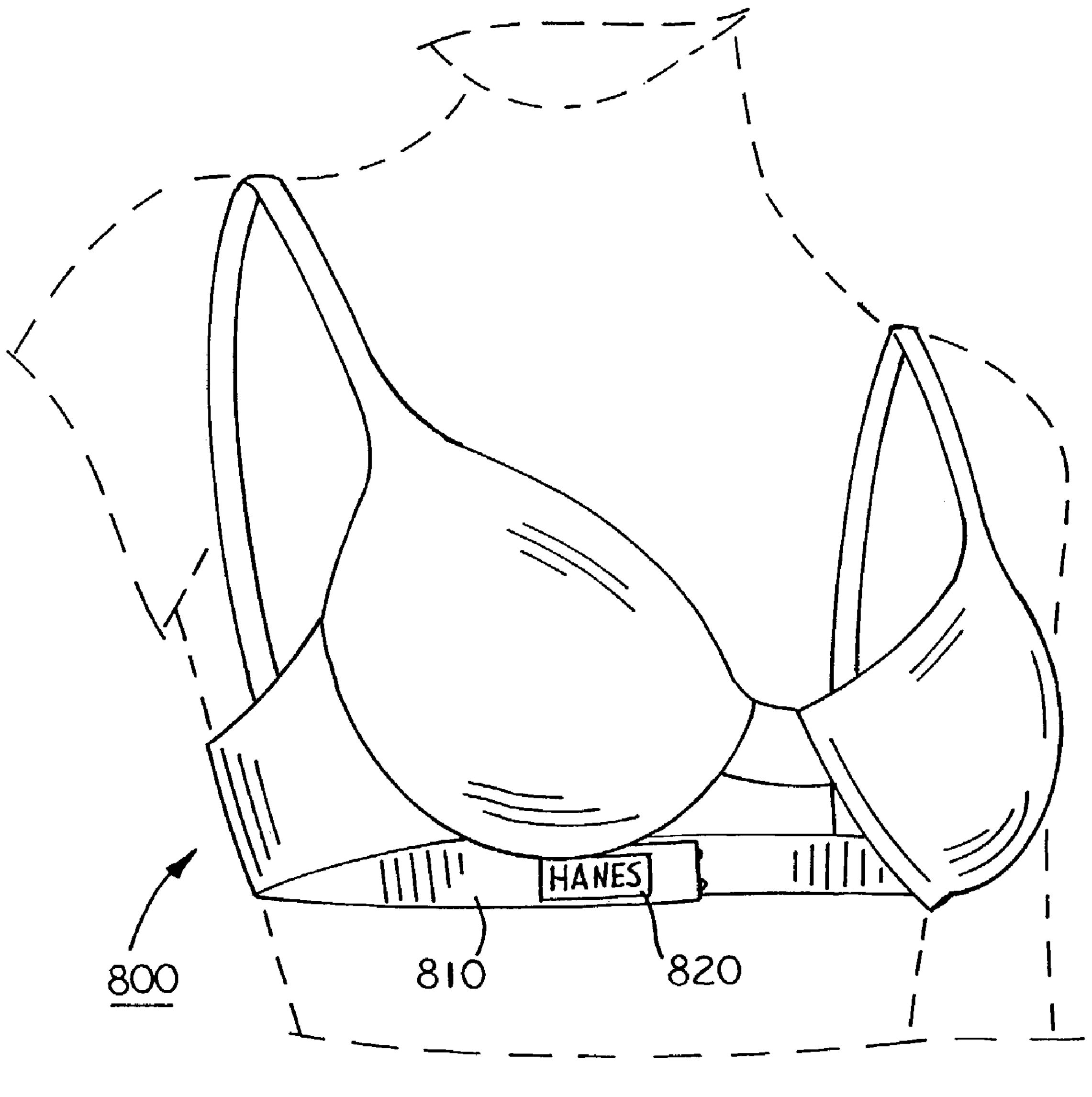

As further shown in FIGS. 6 through 8, the method of the present invention may be used to pad print labels, logos, or other embellishments on a wide spectrum of apparel types. Shirt 600 is exemplary of a T-shirt underwear, outerwear, intimate apparel, or activewear with a product label 620 and a logo 630. By "activewear", we mean athletic apparel, sportswear, casualwear, etc. By "intimate apparel", we mean brassieres, panties, night wear, etc. Either label 620 or logo 630 may be pad printed in a single color, or multiple colors, such as portions 632 and 634 on logo 630. As shown in FIG. 7, briefs 700 are exemplary of underwear and are also shown with a printed product label 720 on waistband 710. As shown in FIG. 8, bra 800 is exemplary of intimate apparel and is shown with a printed product label 820 on strap 810.

In addition to the advantages and unexpected results of the present invention, already described above, it has been found that a product label or other embellishment that is pad printed in accordance with this method has a high durability to repeated launderings. A product label or indicia printed with the ink and hardener described above will readily withstand more than 50 home launderings without any appreciable fading.

Although the present invention has been described with a preferred embodiment, it is to be understood that modifications and variations may be utilized without departing from the spirit and scope of the invention, as those skilled in the art will readily understand. Such modifications and variations are considered to be within the purview and scope of the appended claims and their equivalents.

We claim:

1. A fabric, comprising:

(a) a knitted textile substrate having inner and outer surfaces and a selected thickness; and (b) a product label pad printed directly on the inner surface from a cliché with an ink composition comprising an acrylic-based ink, a quick drying solvent, and a durability-enhancing hardener, wherein the cliché has a depth sufficient to cause the ink composition to penetrate the inner surface to a depth less than the thickness of the textile substrate.

2. The fabric of claim 1 wherein an article of apparel is formed from the fabric.

3. The fabric of claim 2 wherein the article of apparel is underwear.

4. The fabric of claim 2 wherein the article of apparel is outerwear.

5. The fabric of claim 2 wherein the article of apparel is activewear.

6. The fabric of claim 2 wherein the article of apparel is intimate apparel.

7. The fabric of claim 1 wherein the fabric is formed from materials selected from the group consisting of cotton, polyester, nylon, and spandex.

8. The fabric of claim 1 wherein the product label is comprised of a plurality of colors.

9. The fabric of claim 1 wherein the product label is an embellishment.

10. The fabric of claim 9 wherein the embellishment is comprised of a plurality of colors.

11. A tagless article of apparel, comprising:

(a) an article of apparel formed from a knitted fabric having a selected thickness, the article of apparel having inner and outer surfaces; and (b) a product label pad printed directly thereon the inner surface from a cliché with an ink composition comprising an acrylic-based ink, a quick drying solvent, and a durability-enhancing hardener, wherein the cliché has a depth sufficient to cause the ink composition to penetrate the inner surface of the fabric to a depth less than the thickness of the fabric.

12. The article of apparel of claim 11 wherein the article of apparel is underwear.

13. The article of apparel of claim 11 wherein the article of apparel is outerwear.

14. The article of apparel of claim 11 wherein the article of apparel is activewear.

15. The article of apparel of claim 11 wherein the article of apparel is intimate apparel.

16. The article of apparel of claim 11 wherein the fabric is formed from materials selected from the group consisting of cotton, polyester, nylon, and spandex.

17. The article of apparel of claim 11 wherein the product label is comprised of a plurality of colors.

18. The article of apparel of claim 11 wherein the product label is an embellishment.

19. The article of apparel of claim 18 wherein the embellishment is comprised of a plurality of colors.

20. A tagless article of apparel, comprising:

(a) a shirt formed from a knitted fabric having a selected thickness, the shirt having an inner surface and a neck opening; and (b) a product label pad printed directly on the inner surface proximate the neck opening from a cliché with an ink composition comprising an acrylic-based ink, a quick drying solvent, and a durability-enhancing hardener, wherein the cliché has a depth sufficient to cause the ink composition to penetrate the inner surface of the fabric to a depth less than the thickness of the fabric.

21. A tagless article of apparel, comprising:

(a) underwear formed from a knitted fabric having a selected thickness, the underwear having an inner surface and a waist opening; and (b) a product label pad printed directly on the inner surface proximate the waist opening from a cliché with an ink composition comprising an acrylic-based ink, a quick drying solvent, and a durability-enhancing hardener, wherein the cliché has a depth sufficient to cause the ink composition to penetrate the inner surface of the fabric to a depth less than the thickness of the fabric.

22. A tagless article of apparel, comprising:

(a) a brassiere formed from a knitted fabric having a selected thickness, the brassiere having an inner surface and a back strap; and (b) a product label pad printed directly on the inner surface proximate the back strap from a cliché with an ink composition comprising an acrylic-based ink, a quick drying solvent, and a durability-enhancing hardener, wherein the cliché has a depth sufficient to cause the ink composition to penetrate the inner surface of the fabric to a depth less than the thickness of the fabric.

23. A tagless article of apparel, comprising:

(a) pants formed from a knitted fabric having a selected thickness, the pants having an inner surface and a waist opening; and (b) a product label pad printed directly on the inner surface proximate the waist opening from a cliché with an ink composition comprising an acrylic-based ink, a quick drying solvent, and a durability-enhancing hardener, wherein the cliché has a depth sufficient to cause the ink composition to penetrate the inner surface of the fabric to a depth less than the thickness of the fabric.

24. A fabric, comprising:

(a) a knitted textile substrate having inner and outer surfaces and a selected thickness; and (b) a product label pad printed directly on the inner surface from a cliché with an ink composition comprising an acrylic-based ink, a quick drying solvent, and a durability-enhancing hardener, wherein the cliché has a depth of between about 50 microns and about 80 microns wherein the the ink composition penetrates the inner surface to a depth less than the thickness of the textile substrate.

25. A tagless article of apparel, comprising:

(a) an article of apparel formed from a knitted fabric having a selected thickness, the article of apparel having inner and outer surfaces; and (b) a product label pad printed directly thereon the inner surface from a cliché with an ink composition comprising an acrylic-based ink, a quick drying solvent, and a durability-enhancing hardener, wherein the cliché has a depth of between about 50 microns and about 80 microns wherein the the ink composition penetrates the inner surface of the fabric to a depth less than the thickness of the fabric.

26. A tagless article of apparel, comprising:

(a) a shirt formed from a knitted fabric having a selected thickness, the shirt having an inner surface and a neck opening; and (b) a product label pad printed directly on the inner surface proximate the neck opening from a cliché with an ink composition comprising an acrylic-based ink, a quick drying solvent, and a durability-enhancing hardener, wherein the cliché has a depth of between about 50 microns and about 80 microns wherein the the ink composition the inner surface of the fabric to a depth less than the thickness of the fabric.

27. A tagless article of apparel, comprising:

(a) underwear formed from a knitted fabric having a selected thickness, the underwear having an inner surface and a waist opening; and (b) a product label pad printed directly on the inner surface proximate the waist opening from a cliché with an ink composition comprising an acrylic-based ink, a quick drying solvent, and a durability-enhancing hardener, wherein the cliché has a depth of between about 50 microns and about 80 microns wherein the the ink composition penetrates the inner surface of the fabric to a depth less than the thickness of the fabric.

28. A tagless article of apparel, comprising:

(a) a brassiere formed from a knitted fabric having a selected thickness, the brassiere having an inner surface and a back strap; and (b) a product label pad printed directly on the inner surface proximate the back strap from a cliché with an ink composition comprising an acrylic-based ink, a quick drying solvent, and a durability-enhancing hardener, wherein the cliché has a depth of between about 50 microns and about 80 microns wherein the the ink composition penetrates the inner surface of the fabric to a depth less than the thickness of the fabric.

29. A tagless article of apparel, comprising:

(a) pants formed from a knitted fabric having a selected thickness, the pants having an inner surface and a waist opening; and (b) a product label pad printed directly on the inner surface proximate the waist opening from a cliché with an ink composition comprising an acrylic-based ink, a quick drying solvent, and a durability-enhancing hardener, wherein the ratio of the depth of the cliché to the thickness of the knitted fabric is greater than 1.0 so that the the ink composition penetrates the inner surface of the fabric to a depth less than the thickness of the fabric.

* * * * *